US012660948B2

(12) United States Patent
Guo

(10) Patent No.: US 12,660,948 B2
(45) Date of Patent: Jun. 23, 2026

(54) FRAME STRUCTURE OF GAME FENCE

(71) Applicant: Guangzhou Sair Industrial Co., Ltd, Guangzhou (CN)

(72) Inventor: Jiye Guo, Guangzhou (CN)

(73) Assignee: Guangzhou Sair Industrial Co., Ltd, Guangzhou (CN)

( * ) Notice: Subject to any disclaimer, the term of this patent is extended or adjusted under 35 U.S.C. 154(b) by 241 days.

(21) Appl. No.: 18/419,949

(22) Filed: Jan. 23, 2024

(65) Prior Publication Data

US 2025/0127140 A1 Apr. 24, 2025

(30) Foreign Application Priority Data

Oct. 24, 2023 (CN) .......................... 202322868031.6

(51) Int. Cl.
*A47D 13/06* (2006.01)
*A01K 1/03* (2006.01)
*E04H 17/18* (2006.01)
(52) U.S. Cl.
CPC ........... *A47D 13/061* (2013.01); *E04H 17/18* (2013.01); *A01K 1/03* (2013.01)
(58) Field of Classification Search
CPC ...... A47D 9/005; A47D 13/06; A47D 13/061; A47D 13/063; A47D 13/065; A47D 13/066; A47D 13/068; A01K 1/03; E04H 17/18; E04H 17/185; F16B 7/0413; Y10T 403/59; Y10T 403/598; Y10T 403/599
USPC ................................................. 256/25, 65.01
See application file for complete search history.

(56) References Cited

U.S. PATENT DOCUMENTS

| | | | | |
|---|---|---|---|---|
| 4,070,716 A | * | 1/1978 | Satt ...................... | A47D 13/063 5/99.1 |
| 4,422,794 A | * | 12/1983 | Deken ................... | E21B 17/046 403/330 |
| 5,454,124 A | * | 10/1995 | Huang ................. | A47D 13/063 5/98.1 |
| 5,560,055 A | * | 10/1996 | Ziegler ............... | A47D 13/063 5/99.1 |

(Continued)

FOREIGN PATENT DOCUMENTS

| | | | | |
|---|---|---|---|---|
| CN | 212545046 U | * | 2/2021 | ............... A01K 1/03 |
| CN | 219069128 U | | 5/2023 | |

(Continued)

*Primary Examiner* — Amber R Anderson
*Assistant Examiner* — Kevin J Baynes
(74) *Attorney, Agent, or Firm* — JEEN IP LAW, LLC

(57) ABSTRACT

A frame structure of game fence, including a set of bottom connecting rods, a set of upper connecting rods, and a set of support connecting rods, each bottom connecting rod is hinged with bottom end of the support rod and each upper connecting rod is hinged with top end of the support rod to form the frame structure, and a first control joint is provided in the middle of two said upper connecting rods, allowing two said upper connecting rods to move toward each other or away from each other, wherein a second control joint is provided in the middle of two bottom connecting rods, allowing two bottom connecting rods to move toward each other or away from each other, causing the frame structure to contract or expand, and after the frame structure is completely expanded, two bottom connecting rods can be locked by the second control joint.

7 Claims, 4 Drawing Sheets

(56)  References Cited

U.S. PATENT DOCUMENTS

| | | | | |
|---|---|---|---|---|
| 5,988,928 | A | * | 11/1999 | Cheng .................. A47D 13/063 |
| | | | | 5/99.1 |
| 6,343,390 | B1 | * | 2/2002 | Yang ................... A47D 13/063 |
| | | | | 5/98.1 |
| 6,363,550 | B1 | * | 4/2002 | Wang .................. A47D 13/063 |
| | | | | 5/99.1 |
| 6,729,791 | B1 | * | 5/2004 | Chen ................... A47D 13/063 |
| | | | | 403/102 |
| 9,179,786 | B1 | * | 11/2015 | Ransil ................... A47D 9/016 |
| 11,330,916 | B1 | * | 5/2022 | Zhang .................... E04H 17/18 |
| 11,957,254 | B2 | * | 4/2024 | Chui .................... A47D 9/012 |
| 2017/0312644 | A1 | * | 11/2017 | Meir .................... E04H 4/0056 |
| 2024/0268570 | A1 | * | 8/2024 | Guo .................... A47D 13/063 |

FOREIGN PATENT DOCUMENTS

| | | | | | |
|---|---|---|---|---|---|
| CN | 219331185 | U | * | 7/2023 | ........... A47D 13/063 |
| CN | 220255880 | U | * | 12/2023 | ............. F16B 7/185 |

* cited by examiner

FRAME STRUCTURE OF GAME FENCE

CROSS-REFERENCE TO RELATED APPLICATIONS

This application claims priority to Chinese Patent Application No. 202322868031.6, filed on Oct. 24, 2023, which is hereby incorporated by reference in its entirety.

TECHNICAL FIELD

The present invention relates to the field of fence technology, in particular to a frame structure of a game fence.

BACKGROUND

The unfolded folding fence structure can be used to form pet cages, game fences and other products in conjunction with fences, nets, etc., and has the advantages of small size after folding and convenient portability, and is therefore widely popular among users in related fields. A Chinese invention patent with application No. 202223599528.4, titled a foldable fence structure, includes a plurality of bottom connecting rods, upper connecting rods, and support rods. The connecting rods above each bottom connecting rod are respectively connected to the bottom and top ends of the support rod to form a square frame structure; the control joint provided in the middle of the upper connecting rod can, after the square frame structure is unfolded, lock the two ends of the upper connecting rod without folding, and a direct joint is provided in the middle of the bottom connecting rod, the direct joint has a simple rotating structure so that the bottom connecting rod forms a structure that can rotate and fold upwards; in practical use, due to the lack of a locking structure in the direct joint, the square frame structure will, after being fully unfolded, still rotate and fold the two ends of the bottom connecting rod upwards under external forces, such as human intervention, causing deformed square frame structure and unstable overall structure that seriously affect its application.

SUMMARY

The main purpose of the invention is to propose a frame structure of game fence, solving the problems raised in the background art mentioned above.

To achieve above purpose, the invention proposes a frame structure of game fence, including a plurality of bottom connecting rods, upper connecting rods, and support connecting rods, each bottom connecting rod and upper connecting rod are hinged with the bottom and top ends of support rod to form a frame structure, and a first control joint is provided in the middle of the upper connecting rod, allowing the two ends of the upper connecting rod to move between the positions where they are close to and far from each other, wherein a second control joint is provided in the middle of the bottom connecting rod, so that the two ends of the bottom connecting rod can move between the positions where they are close to and far away from each other, forming a frame structure that can be folded or unfolded, and after the frame structure is completely unfolded, the two ends of the bottom connecting rod can be locked by the second control joint.

The technical solution of the present invention forms a frame structure by assembling a plurality of bottom connecting rods, upper connecting rods, and support rods, and a first control joint and a second control joint are respectively provided in the middle position of the upper connecting rod and the middle position of the bottom connecting rod, and the two ends of the upper connecting rod and the two ends of the bottom connecting rod can move between the positions where they are close to and far from each other through the first and second control joints, respectively, forming a frame structure that can be folded or unfolded, and the two ends of the bottom connecting rod can be locked through the second control joint after the frame structure is fully unfolded, thereby completely locking the unfolded frame structure in conjunction with the first control joint. Compared with traditional methods, the present invention adds a locking function for the bottom connecting rod, so that the unfolded frame structure can be completely locked, not easily deformed, and provide stable structure and easy operation.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

This invention proposes a frame structure for a game fence.

Figure 1:
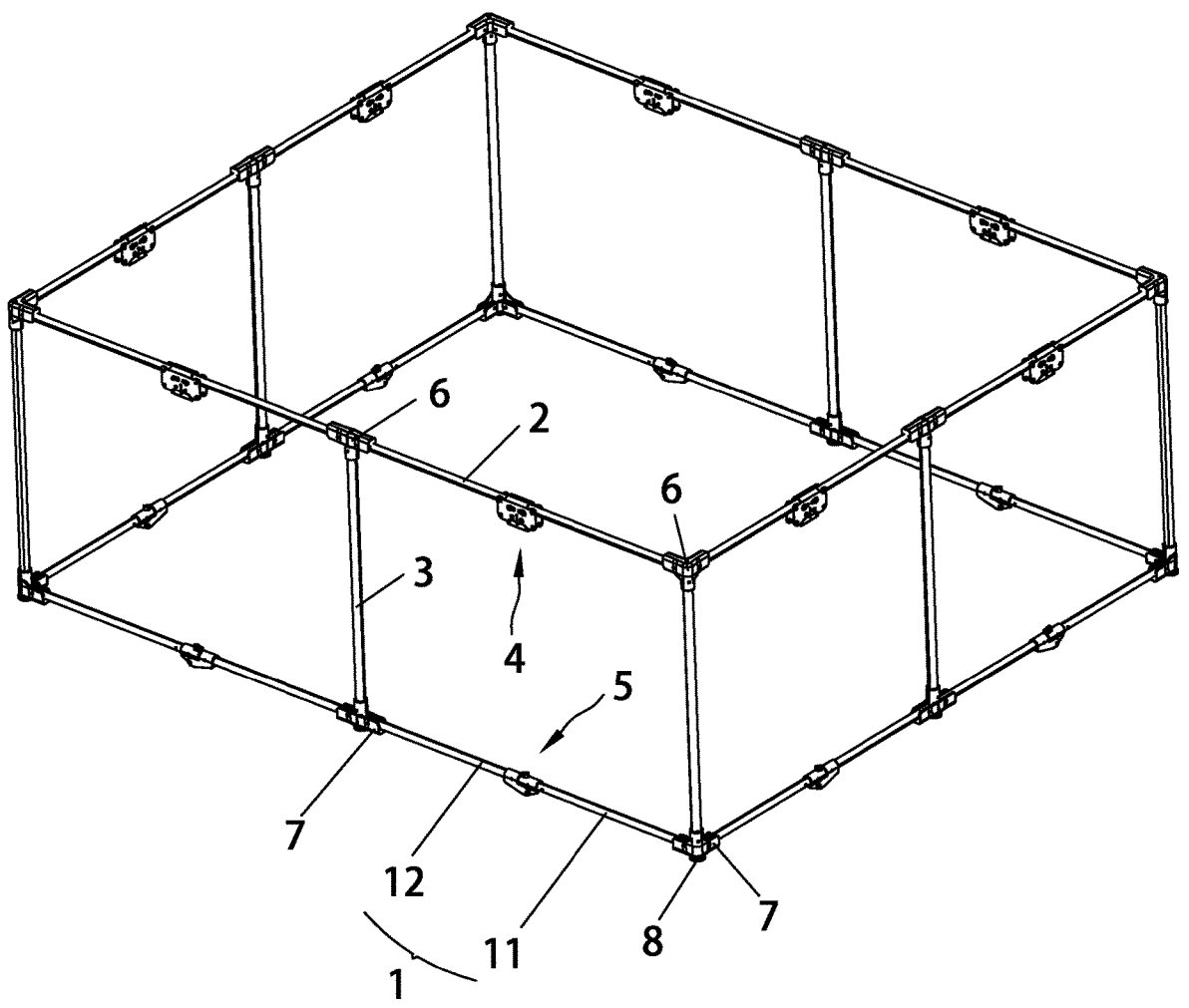
FIG. 1 is a three-dimensional view of the present invention.
Figure 2:
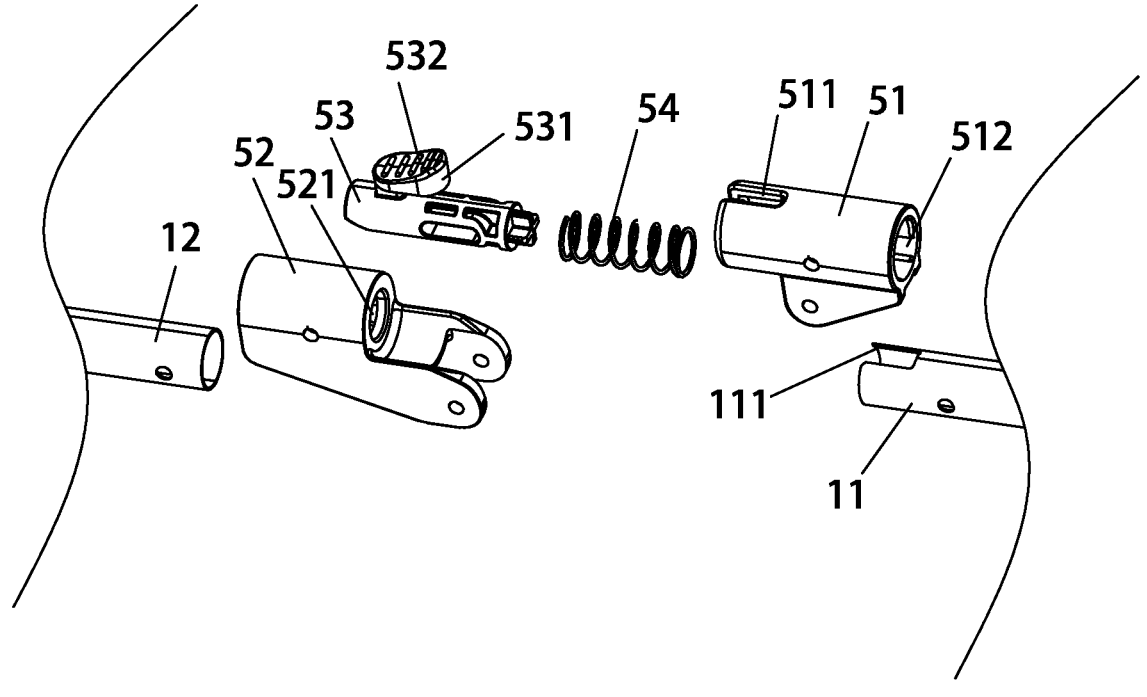
FIG. 2 is an exploded view of the second control joint.
Figure 3:
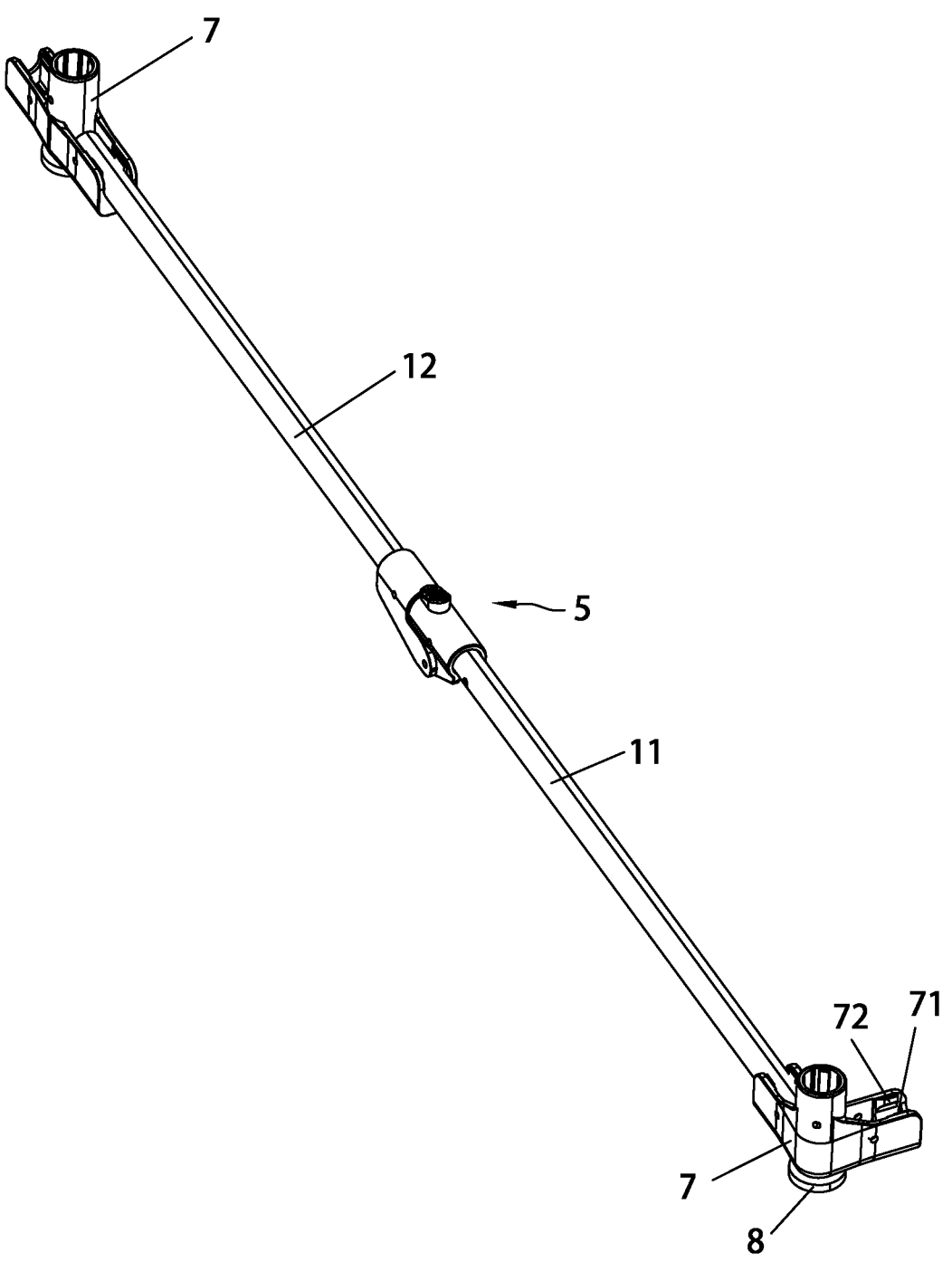
FIG. 3 is an assembly diagram of the bottom connecting rod, second control joint, and second connector.
Figure 4:
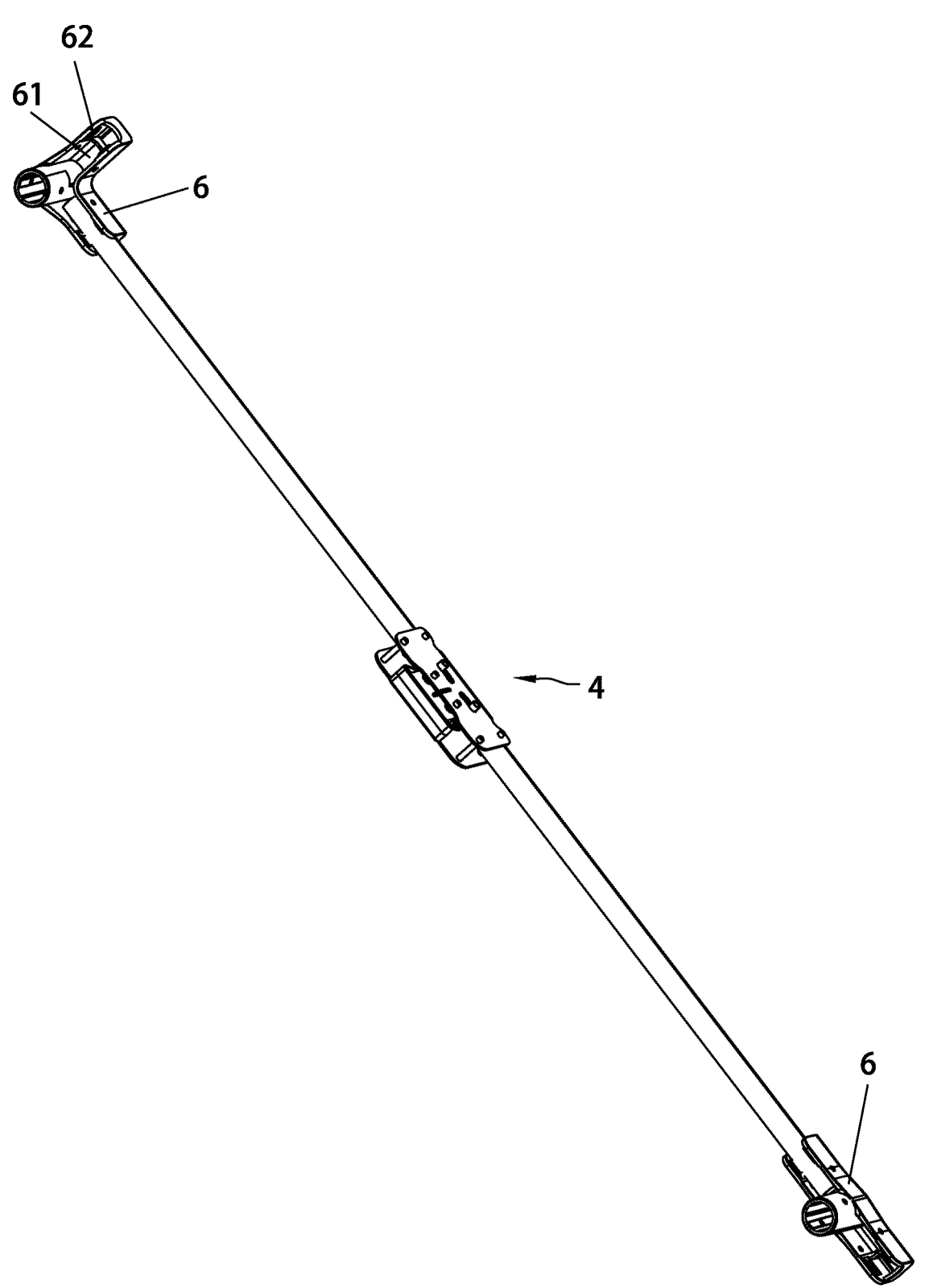
FIG. 4 is an assembly diagram of the upper connecting rod, first control joint, and first connector.

In the embodiments of this invention, as shown in FIGS. 1 to 4, the frame structure of game fence includes a plurality of bottom connecting rods 1, upper connecting rods 2, and support connecting rods 3, each bottom connecting rod 1 and upper connecting rod 2 are hinged with the bottom and top ends of support rod 3 to form a frame structure, and a first control joint 4 is provided in the middle of the upper connecting rod 2, allowing the two ends of the upper connecting rod 2 to move between the positions where they are close to and far from each other, wherein a second control joint 5 is provided in the middle of the bottom connecting rod 1, so that the two ends of the bottom connecting rod 1 can move between the positions where they are close to and far away from each other, forming a frame structure that can be folded or unfolded, and after the frame structure is completely unfolded, the two ends of the bottom connecting rod 1 can be locked by the second control joint 5.

The technical solution of the present invention forms a frame structure by assembling a plurality of bottom connecting rods, upper connecting rods, and support rods, and a first control joint and a second control joint are respectively provided in the middle position of the upper connecting rod and the middle position of the bottom connecting rod, and the two ends of the upper connecting rod and the two ends of the bottom connecting rod can move between the positions where they are close to and far from each other through the first and second control joints, respectively, forming a frame structure that can be folded or unfolded, and the two ends of the bottom connecting rod can be locked through the second control joint after the frame structure is fully unfolded, thereby completely locking the unfolded frame structure in conjunction with the first control joint. Compared with traditional methods, the present invention adds a locking function for the bottom connecting rod, so that the unfolded frame structure can be completely locked, not easily deformed, and provide stable structure and easy operation.

It should be noted that for the first control joint 4, reference can be made to prior art, or to the control joint in the Chinese invention patent with application No. 202223599528.4, titled a foldable fence structure, and the specific structural principle of the control joint is not elaborated here.

Specifically, the second control joint 5 includes a first connecting base 51 and a second connecting base 52 that are mutually hinged, the bottom connecting rod 1 is structurally hollow, the bottom connecting rod 1 includes a first bar member 11 connected to the first connecting base 51 and a second bar member 12 connected to the second connecting base 52, the first connecting base 51 is movably provided with a locking member 53 that can move relative to the first connecting base 51 between the position where the locking member 53 partially extends into the second bar member 12 and the position where the locking member 53 withdraws from the second bar member 12, and after the locking member 53 partially extends into the second bar member 12, the locking member 53 can lock the first connecting base 51 and the second connecting base 52, thereby locking the first bar member 11 and the second bar member 12.

Specifically, a top spring 54 is also provided for applying elastic force to the locking member 53 so that the locking member 53 can move in a direction of local extension into the interior of the second bar member 12.

Specifically, the top spring 54 is located inside the first bar member 11, the first bar member 11 is provided with a pin that can partially pass through the first bar member 11, and one end of the top spring 54 is in contact with the pin, and the other end is elastically in contact with the end of the locking member 53 that is away from the second bar member 12.

Specifically, the locking member 53 is provided with a driving portion 531 that can be exposed outside the first connecting base 51, and the locking member 53 can move relative to the first connecting base 51 between the position where the driving portion 531 is in contact and the position where the driving portion 531 is away from the end wall of the second bar member 12, and when the driving portion 531 is in contact with the end wall of the second bar member 12, the locking member 53 partially extends into the second bar member 12, and a avoidance hole 511 is provided at the position of the first connecting base 51 corresponding to the movement path of the driving portion 531, and the driving portion 531 can be manually pushed to force the locking member 53 to move in the direction of partially exiting the interior of the second bar member 12, and the driving portion 531 can be avoided through the avoidance hole 511 when the locking member 53 moves in the direction of partially exiting the interior of the second bar member 12.

Specifically, the top wall of the driving portion 531 is provided with a plurality of anti slip strips 532.

Specifically, the first connecting base 51 and the second connecting base 52 are respectively provided with a first through slot 512 for inserting the end of the first bar member 11 and a second through slot 521 for inserting the end of the second bar member 12, the first connecting base 51 can swing relative to the second connecting base 52 between the position where the first through slot 512 is connected with the second through slot 521 and the position where the first through slot 512 is disconnected from the second through slot 521, and the end of the first bar member 11 and of the second bar member 12 are respectively inserted into the first through slot 512 and the second through slot 521 and fixed by bolts or rivets.

Specifically, the two ends of the support rod 3 are respectively provided with a first connector 6 and a second connector 7, the first connector 6 is provided with a first pivot groove 61 for pivotable connection with the end of the upper connecting rod 2, and the second connector 7 is provided with a second pivot groove 71 for pivotable connection with the end of the bottom connecting rod 1.

Understandably, when there are small number of bottom connecting rods 1 and upper connecting rods 2, for example, four, the formed frame structure is a smaller square shaped frame, the first connector 6 and the second connector 7 form a right angle structure to provide corner transition for the square frame; when there are a large number of, such as eight, bottom connecting rods 1 and upper connecting rods 2, the formed frame structure is a smaller square frame, the first connector 6 and the second connector 7 are in a straight and right angle shape; the linear first connector 6 and the second connector 7 can increase the length and width of the square frame, and the right angled first connector 6 and second connector 7 allows for the corner transition of the square frame.

Specifically, the two opposite sides of the first pivot groove 61 are provided with first clamping blocks 62 for elastic fit with the outer wall of the upper connecting rod 2, and the two opposite sides of the second pivot groove 71 are provided with second clamping blocks 72 for elastic fit with the outer wall of the bottom connecting rod 1.

Specifically, the bottom wall of the second connector 7 is provided with a gasket 8.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. A frame structure of a game fence, including a set of bottom connecting rods (1), a set of upper connecting rods (2), and a set of support connecting rods (3), each bottom connecting rod (1) is hinged with a respective bottom end of one of the support rods (3) and each upper connecting rod (2) is hinged with a respective top end of one of the support rods (3) to form the frame structure;

a first control joint (4) is provided in the middle of one of the upper connecting rods (2), allowing two ends of said upper connecting rod (2) to move toward each other or away from each other, wherein a second control joint (5) is provided in the middle of one of the bottom connecting rods (1), allowing two ends of said bottom connecting rod (1) to move toward each other or away from each other, causing the frame structure to contract or expand, and after the frame structure is completely expanded, said one bottom connecting rod (1) can be locked by the second control joint (5);

wherein the second control joint (5) includes a first connecting base (51) and a second connecting base (52) that are mutually hinged, said one bottom connecting rod (1) is structurally hollow, said one bottom connecting rod (1) includes a first bar member (11) connected to the first connecting base (51) and said one bottom connecting rod (1) includes a second bar member (12) connecting to the second connecting base (52), the first connecting base (51) is movably provided with a locking member (53) that can move relative to the first connecting base (51) between a position where the locking member (53) partially extends into the second bar member (12) and a position where the locking member (53) withdraws from the second bar member (12), and after the locking member (53) partially extends into the second bar member (12), the locking member (53) can lock the first connecting base (51) and the second connecting base (52), thereby locking the first bar member (11) and the second bar member (12);

wherein a top spring (54) is also provided within the second control joint (5) for applying elastic force to the locking member (53) so that the locking member (53) can move in a direction of local extension into an interior of the second bar member (12);

wherein the top spring (54) is located inside the first bar member (11), the top spring being entirely exposed within the interior of the first bar member (11), the first bar member (11) is provided with a pin that can partially pass through the first bar member (11), one end of the top spring (54) is in contact with the pin, and the other end of the top spring is elastically in contact with a terminal end of the locking member (53) that faces away from the second bar member (12).

2. The frame structure of a game fence according to claim 1, wherein the locking member (53) is provided with a driving portion (531) that is exposed outside the first connecting base (51), the locking member (53) being movable relative to the first connecting base (51) between a position where the driving portion (531) is in contact with an end wall of the second bar member (12) and a position where the driving portion (531) is away from the end wall of the second bar member (12);

when the driving portion (531) is in contact with the end wall of the second bar member (12), the locking member (53) partially extends into the second bar member (12); and wherein an avoidance hole (511) is provided at a position of the first connecting base (51) corresponding to a movement path of the driving portion (531).

3. The frame structure of a game fence according to claim 2, wherein a top wall of the driving portion (531) is provided with a plurality of anti-slip strips (532).

4. The frame structure of a game fence according to claim 1, wherein the first connecting base (51) is provided with a first through slot (512) for inserting an end of the first bar member (11) and the second connecting base (52) is provided with a second through slot (521) for inserting an end of the second bar member (12), the first connecting base (51) being swingable relative to the second connecting base (52) between a position where the first through slot (512) is connected with the second through slot (521) and a position where the first through slot (512) is disconnected from the second through slot (521); and the end of the first bar member (11) being inserted into the first through slot (512) and fixed by bolts or rivets, the second bar member (12) being inserted into the second through slot (521) and fixed by bolts or rivets.

5. The frame structure of a game fence according to claim 1, wherein top and bottom ends of one of the support rods (3) are respectively provided with a first connector (6) and a second connector (7), the first connector (6) is provided with a first pivot groove (61) for pivotable connection with one of the ends of the one upper connecting rod (2), and the second connector (7) is provided with a second pivot groove (71) for pivotable connection with one of the ends of the one bottom connecting rod (1).

6. The frame structure of a game fence according to claim 5, wherein two opposite sides of the first pivot groove (61) are provided with first clamping blocks (62) for elastic fit with an outer wall of the one upper connecting rod (2), and two opposite sides of the second pivot groove (71) are provided with second clamping blocks (72) for elastic fit with an outer wall of the one bottom connecting rod (1).

7. The frame structure of a game fence according to claim 5, wherein a bottom wall of the second connector (7) is provided with a gasket (8).

* * * * *